US008977258B2

(12) United States Patent
Chou

(10) Patent No.: US 8,977,258 B2
(45) Date of Patent: Mar. 10, 2015

(54) SYSTEM AND METHOD FOR COMMUNICATING WITH FIXED AND MOBILE SUBSCRIBER STATIONS IN BROADBAND WIRELESS ACCESS NETWORKS

(75) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 1596 days.

(21) Appl. No.: 11/222,675

(22) Filed: Sep. 9, 2005

(65) Prior Publication Data

US 2007/0076639 A1    Apr. 5, 2007

(51) Int. Cl.

| H04W 4/00 | (2009.01) |
|---|---|
| H04L 12/24 | (2006.01) |
| H04W 84/04 | (2009.01) |
| H04W 88/10 | (2009.01) |
| H04W 92/02 | (2009.01) |

(52) U.S. Cl.
CPC ........ H04L 41/0213 (2013.01); H04L 41/0226 (2013.01); *H04W 84/04* (2013.01); *H04W 88/10* (2013.01); *H04W 92/02* (2013.01)
USPC ................... 455/435.1; 455/435.2; 455/435.3

(58) Field of Classification Search
USPC ........................................... 455/435.1–435.3
See application file for complete search history.

(56) References Cited

U.S. PATENT DOCUMENTS

| 6,404,754 | B1 * | 6/2002 | Lim .............................. 370/338 |
|---|---|---|---|
| 7,437,157 | B1 * | 10/2008 | Satapathy .................. 455/435.1 |
| 2003/0076837 | A1 * | 4/2003 | Whitehill et al. .......... 370/395.4 |
| 2004/0018839 | A1 * | 1/2004 | Andric et al. ................ 455/433 |
| 2004/0233838 | A1 * | 11/2004 | Sudo et al. .................... 370/208 |
| 2005/0068915 | A1 * | 3/2005 | Atad et al. .................... 370/316 |
| 2005/0201304 | A1 * | 9/2005 | Olshansky .................... 370/282 |
| 2005/0250498 | A1 * | 11/2005 | Lim et al. ..................... 455/436 |
| 2005/0286451 | A1 * | 12/2005 | Kim et al. .................... 370/310 |
| 2006/0030322 | A1 * | 2/2006 | Kim et al. .................... 455/436 |
| 2006/0034397 | A1 * | 2/2006 | Lee et al. ...................... 375/340 |
| 2007/0025390 | A1 * | 2/2007 | Jain .............................. 370/458 |

FOREIGN PATENT DOCUMENTS

WO    WO-2006/083897 A2    8/2006

OTHER PUBLICATIONS

"IEEE Standard 802.16a™—IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz", *IEEE Std. 802.16a™—2003*, The Institute Electrical and Electronics Engineers, Inc., New York, NY, (2003), 318 pgs.

(Continued)

*Primary Examiner* — Olumide T Ajibade Akonai
*Assistant Examiner* — Shantell L Heiber
(74) *Attorney, Agent, or Firm* — Kacvinsky Daisak Bluni PLLC

(57) ABSTRACT

Embodiments of System and Method for Communicating within Broadband Wireless Networks are generally described herein. Other embodiments may be described and claimed.

21 Claims, 7 Drawing Sheets

(56) References Cited

OTHER PUBLICATIONS

"IEEE Standard 802.16e™—IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1", *IEEE Std. 802.16e™—2005 and IEEE Std. 802.16™—2004/Cor1—2005 (Amendment and Corrigendum to IEEE 802.16—2004)*, The Institute of Electrical and Electronics Engineers, Inc., New York, NY, (2006), 864 pgs.

"IEEE Standard 802.16f™—IEEE Standard for Local and Metropolitan Area Networks, Part 16: Air Interface for Fixed Broadband Wireless Access Systems—Amendment 1: Management Information Base", *IEEE Std. 802.16f™—2005*, IEEE, New York, NY, (2005), 257 pgs.

Chou, J., et al., "MAC and PHY MIB for WirelessMAN and WirelessHuman BS and SS", (Jul. 9, 2004),1-120.

Liang, C., "Wireless awareness for wireless intelligent network", Communications, 2003, *APCC 2003, 2*, The 9th Asia-Pacific Conference,(Sep. 21.2003),561-564.

\* cited by examiner

| IFTABLE | IFINDEX | IFTYPE(IANA) | IFDESCR | IFPHYSADDRESS | IFADMINSTATUS | IFOPERSTATUS |
|---|---|---|---|---|---|---|
| BS SECTOR 1 | 1 | PROPBWAP2MP | OFDM | MAC ADDRESS OF BS SECTOR | ADMINISTRATION STATUS | OPERATIONAL STATUS |
| BS SECTOR 2 | 2 | PROPBWAP2MP | OFDMA 2048 | MAC ADDRESS OF BS SECTOR | ADMINISTRATION STATUS | OPERATIONAL STATUS |
| BS SECTOR 3 | 3 | PROPBWAP2MP | OFDMA 1024 | MAC ADDRESS OF BS SECTOR | ADMINISTRATION STATUS | OPERATIONAL STATUS |
| BS SECTOR 4 | 4 | PROPBWAP2MP | OFDMA 512 | MAC ADDRESS OF BS SECTOR | ADMINISTRATION STATUS | OPERATIONAL STATUS |
| BS SECTOR 5 | 5 | PROPBWAP2MP | OFDMA 128 | MAC ADDRESS OF BS SECTOR | ADMINISTRATION STATUS | OPERATIONAL STATUS |

Fig. 2

SYSTEM AND METHOD FOR COMMUNICATING WITH FIXED AND MOBILE SUBSCRIBER STATIONS IN BROADBAND WIRELESS ACCESS NETWORKS

TECHNICAL FIELD

Embodiments of the present invention pertain to wireless networks and wireless communications. Some embodiments pertain to broadband wireless access (BWA) networks.

BACKGROUND

In wireless communication networks, including broadband wireless access (BWA) networks, a base station may desire to communicate with many different types of subscriber stations, including fixed subscriber stations and mobile subscriber stations. Subscriber stations operating in accordance with different network protocols and standards may wish to concurrently communicate with a base station. Examples of different network protocols and standards include the Institute of Electrical and Electronic Engineers (IEEE) 802.16(e) proposed specification for both mobile and fixed subscriber stations and the IEEE 802.16-2004 standard for fixed subscriber stations. These standards are referenced below.

BRIEF DESCRIPTION OF THE DRAWINGS

FIG. 2 illustrates an example of a base station interface table in accordance with some embodiments of the present invention;

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
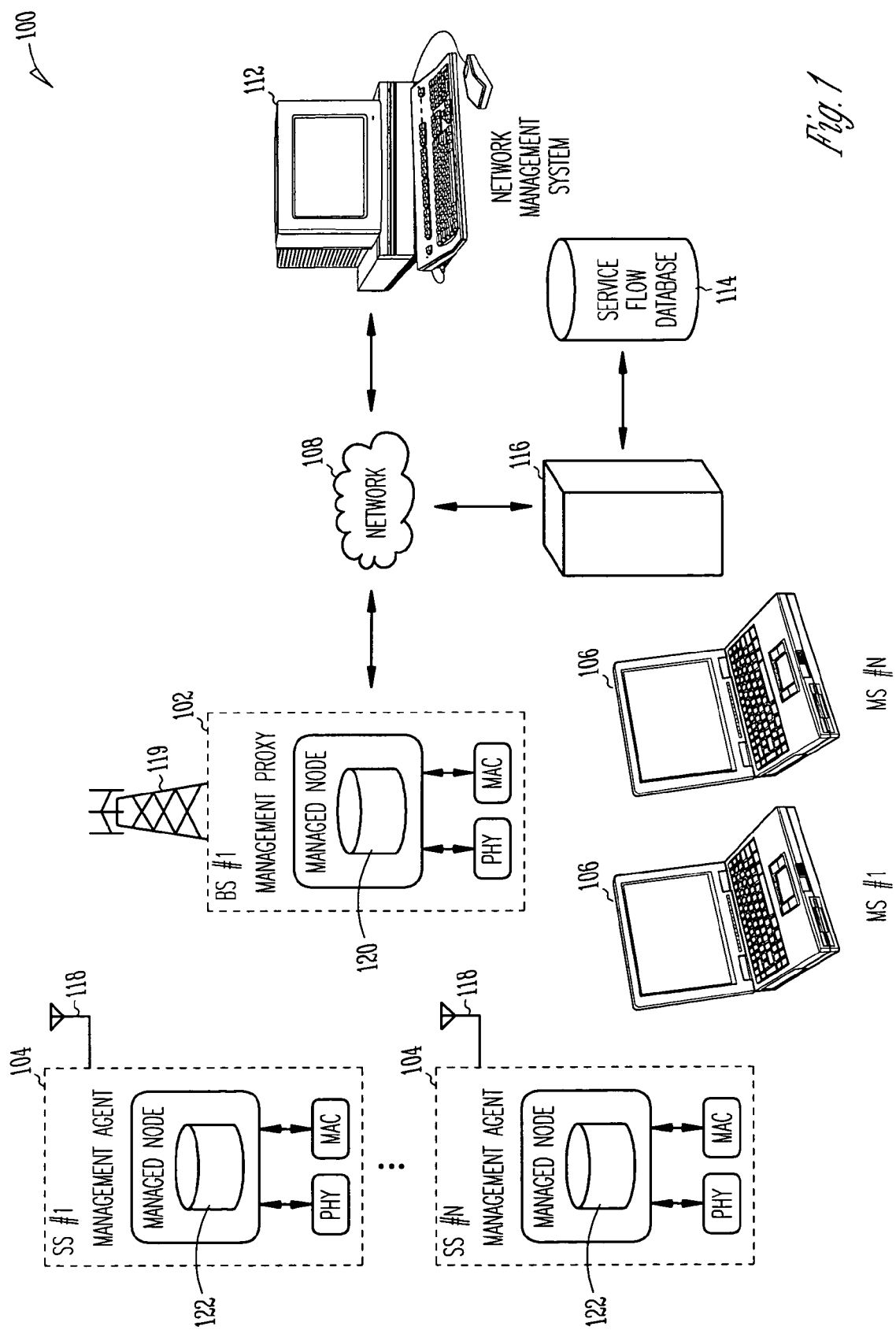
FIG. 1 illustrates a broadband wireless access (BWA) network in accordance with some embodiments of the present invention.

FIG. 1 illustrates a broadband wireless access (BWA) network in accordance with some embodiments of the present invention. Broadband wireless network 100 includes base station (BS) 102 which may communicate with one or more fixed subscriber stations (SS) 104 and one or more mobile subscriber stations (MS) 106. Base station 102 may be coupled through network 108 to network management system (NMS) 112, servers 116 and database 114. Network 108 may be an internet-protocol (IP) based network, such as the internet, although the scope of the invention is not limited in this respect.

Network 100 may be based on the IEEE 802.16-2004 standard and/or IEEE 802.16(e) proposed specification for wireless metropolitan area networks (WMAN) referenced below, although the scope of the invention is not limited in this respect. Base station 102 includes management information base (MIB) 120 that may be managed directly by network management system 112. Subscriber stations 104 may also include subscriber stations management information bases 122 that may be managed directly by network management system 112, or indirectly by base station 102 which acts as a front-end proxy. In some embodiments, the front-end proxy may unwrap packets to determine to which subscriber station 104 a packet should be forwarded based on the packet context. The packets may include management network protocol packets, such as simple network management protocol (SNMP) packets, although the scope of the invention is not limited in this respect. Mobile subscriber stations 106 may be notebook client devices, for example, that may not include an MIB. Mobile subscriber stations 106 may be managed indirectly via base station 102 which may act as a back-end proxy. In these embodiments, the back-end proxy may convert the SNMP packets to a management protocol that mobile subscriber stations are running.

In accordance with some embodiments of the present invention, the front-end proxy may be viewed as per-packet multiplexing as the proxy operation occurs before the SNMP packet has been completely parsed and before any of the packet's VarBinds are examined. A packet may include one or more VarBinds that reference addition information, such as indications of causes of failures. A description may be decoded from the VarBind. For example, if an SNMPv3 request packet is to be rejected by an SNMP agent, the agent may send a report packet that contains one or more VarBinds showing the cause of failures. An SNMP manager application may decode the description of the failures from the one or more VarBinds. Each SNMP message may be forwarded in its entirety to a new destination determined by the context of the request. Context is an attribute of an SNMP request that was created after the community string. In SNMPv3 (which does not use community strings), the context is specified separately from the authentication secret. In SNMPv1 and SNMPv2c, the community string serves a dual role as the authentication secret and as the context. Context may comprise a collection of management information accessible by an SNMP entity. An item of management information may exist in more than one context. An SNMP entity potentially has access to many contexts.

In accordance with some embodiments of the present invention, the back-end proxy, on the other hand, may be viewed as per-VarBind multiplexing as the proxy operation may occur after the SNMP packet has been completely parsed and while the VarBinds are being processed individually. This fronting may occur at the point where the SNMP agent would normally exchange data directly with the application's data registers.

In some embodiments, fixed subscriber stations 104 may be managed nodes. A managed node refers to devices that are managed by a management station of network management system 112. For example, fixed subscriber stations 104 and base station 102 may be managed nodes. The management agent may be an SNMP agent. In some embodiments, a managed device may be a network node that includes an SNMP agent and resides on a managed network. Managed devices may collect and store management information and may make the collected information available to network management system 112 using SNMP, for example. Managed devices may also include network elements and can be routers and access servers, switches and bridges, hubs, computer hosts, or printers, for example. In some embodiments, an agent may be a network-management management software module that may resides in a managed device. In some embodiments, an agent has local knowledge of management information and translates that information into a form compatible with SNMP. In some embodiments, network management system 112 may execute applications that monitor and control managed devices. Network management system 112 may provide the bulk of the processing and memory resources required for network management, although the scope of the invention is not limited in this respect.

In some embodiments, the management information base defined by some embodiments of present invention may allow the migration of conventional management information bases to support both mobile and fixed subscriber stations, such as fixed subscriber station based on the IEEE 802.16-2004 standard and mobile and fixed subscriber stations based on the IEEE 802.16(e) proposed specification, although the scope of the invention is not limited in this respect. In some embodiments, a standards based MIB and method to manage IEEE 802.16(e) based BWA networks is provided which may be very robust to support both IEEE 802.16-2004 fixed and IEEE 802.16(e) mobile networks simultaneously. In some embodiments, the MIB and method may be flexible enough to support mobile subscriber stations that may use non-SNMP based management protocol. In accordance with embodiments of the present invention, through messages exchanged during subscriber station network entry and capability negotiation, base station 102 determines the MAC version and whether fixed and mobile subscriber stations support mobility.

In accordance with some embodiments of the present invention, base station 102 may be able to manage both fixed subscriber stations 104 and mobile subscriber stations 106 simultaneously when base station 102 has multiple sectors to support the IEEE 802.16-2004 standard and the IEEE 802.16 (e) proposed specification, separately.

In accordance with some embodiments of the present invention, base station 102 may be able to manage both fixed subscriber stations 104 and mobile subscriber stations 106 simultaneously when base station 102 has multiple sectors to support. IEEE 802.16-2004 and IEEE 802.16(e) standards, separately.

In some embodiments, base station 102, fixed subscriber stations 104 and mobile subscriber stations 106 may communicate either orthogonal frequency division multiplexed (OFDM) communication signals or orthogonal frequency division multiple access (OFDMA) communication signals over a multicarrier communication channel. The multicarrier communication channel may be within a predetermined frequency spectrum and may comprise a plurality of orthogonal subcarriers. In some embodiments, the orthogonal subcarriers may be closely spaced subcarriers. To help achieve orthogonality between the closely spaced subcarriers, each subcarrier may have a null at substantially a center frequency of the other subcarriers and/or each subcarrier may have an integer number of cycles within a symbol period, although the scope of the invention is not limited in this respect.

In some embodiments, base station 102 may be a Wireless Fidelity (WiFi), Worldwide Interoperability for Microwave Access (WiMax), or broadband communication station, although the scope of the invention is not limited in this respect. In some embodiments, mobile subscriber stations 106 may be portable wireless communication devices, such as personal digital assistants (PDAs), a laptop or portable computers with wireless communication capability, web tablets, wireless telephones wireless headsets, pagers, instant messaging devices, or other mobile devices that may receive and/or transmit information wirelessly.

In some embodiments, the frequency spectrums for the multicarrier communication signals communicated by base station 102, subscriber stations 104 and mobile subscriber stations 106 may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequency channels between 2 and 11 GHz, although the scope of the invention is not limited in this respect.

In some embodiments, base station 102, subscriber stations 104 and mobile subscriber stations 106 may communicate in accordance with specific communication standards, such as the IEEE standards and proposed specifications including the IEEE 802.16 standard for wireless metropolitan area networks (WMANs), although the scope of the invention is not limited in this respect. For more information with respect to IEEE 802.16 standards, please refer to "IEEE Standards for Information Technology—Telecommunications and Information Exchange between Systems—Local and Metropolitan Area Network—Specific Requirements—Part 16: ISO/IEC 8802-16: 1999" and related amendments/versions.

Base station 102 may include one or more antennas 119, each of which may be associated with a different sector. Subscriber stations 104 may also include one or more antennas 118. Mobile subscriber stations 106 may also include one or more antennas not separately illustrated. Antennas 118 and 119, including the antennas of mobile subscriber stations 106, may comprise one or more directional or omnidirectional antennas, including, for example, dipole antennas, monopole antennas, patch antennas, loop antennas, microstrip antennas or other types of antennas suitable for transmission of radio-frequency (RF) signals. In some embodiments, instead of two or more antennas, a single antenna with multiple apertures may be used.

Although the elements of base station 102, subscriber stations 104 and mobile subscriber stations 106 are illustrated as several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements base station 102, subscriber stations 104 and mobile subscriber stations 106 may refer to one or more processes operating on one or more processing elements.

FIG. 2 illustrates an example of a base station interface table in accordance with some embodiments of the present invention. Base station interface (if) table 200 may be used to characterize a multi-sector base station, such as base station 102 that supports OFDM and OFDMA communications with various fast-Fourier Transform (FFT) sizes. In this example, table 200 may be used to characterize a five sector base station for FFT sizes of 2048, 1024, 512, and 128, although the scope of the present invention is not limited in this respect. The sectors may correspond to different antenna sectors of a base station. In some embodiments, the base station may employ orthogonal communications at least within each adjacent sector. In some embodiments, when base station 102 communicates with the fixed and mobile subscriber stations within a plurality of antenna sectors, base station 102 may simultaneously communicates with at least some of the admitted mobile subscriber stations and at least some of the fixed subscriber station using differing fast Fourier transform (FFT) sizes identified in the management information base. In these embodiments, at least some of the antenna sectors using the different FFT sizes. In some embodiments, prior to transmitting the network admission requests, the fixed and mobile subscriber stations may synchronize to downlink channels transmitted by base station 102 by attempting to synchronize with a frame preamble for different channels and different FFT sizes to determine a correct channel and FFT size being used by base station 102, and wherein after the correct channel and FFT size are determined, the fixed and mobile subscriber stations attempt to process a frame control header for different cyclic prefix sizes to determine a correct cyclic prefix size.

As illustrated in Table 200, a base station may communicate with subscriber stations and mobile subscriber stations based on the following physical (PHY) layer configurations: a SS based on IEEE 802.16-2004 (i.e., OFDM 256 or OFDMA 2048); a SS based on IEEE 802.16(e) (i.e., OFDMA with an FFT size of 1024, 512, and 128) and a MS based on IEEE 802.16(e) (i.e., OFDMA with an FFT size of 1024, 512, and 128). The use of table 200 within a base station is discussed in more detail below.

Figure 3:
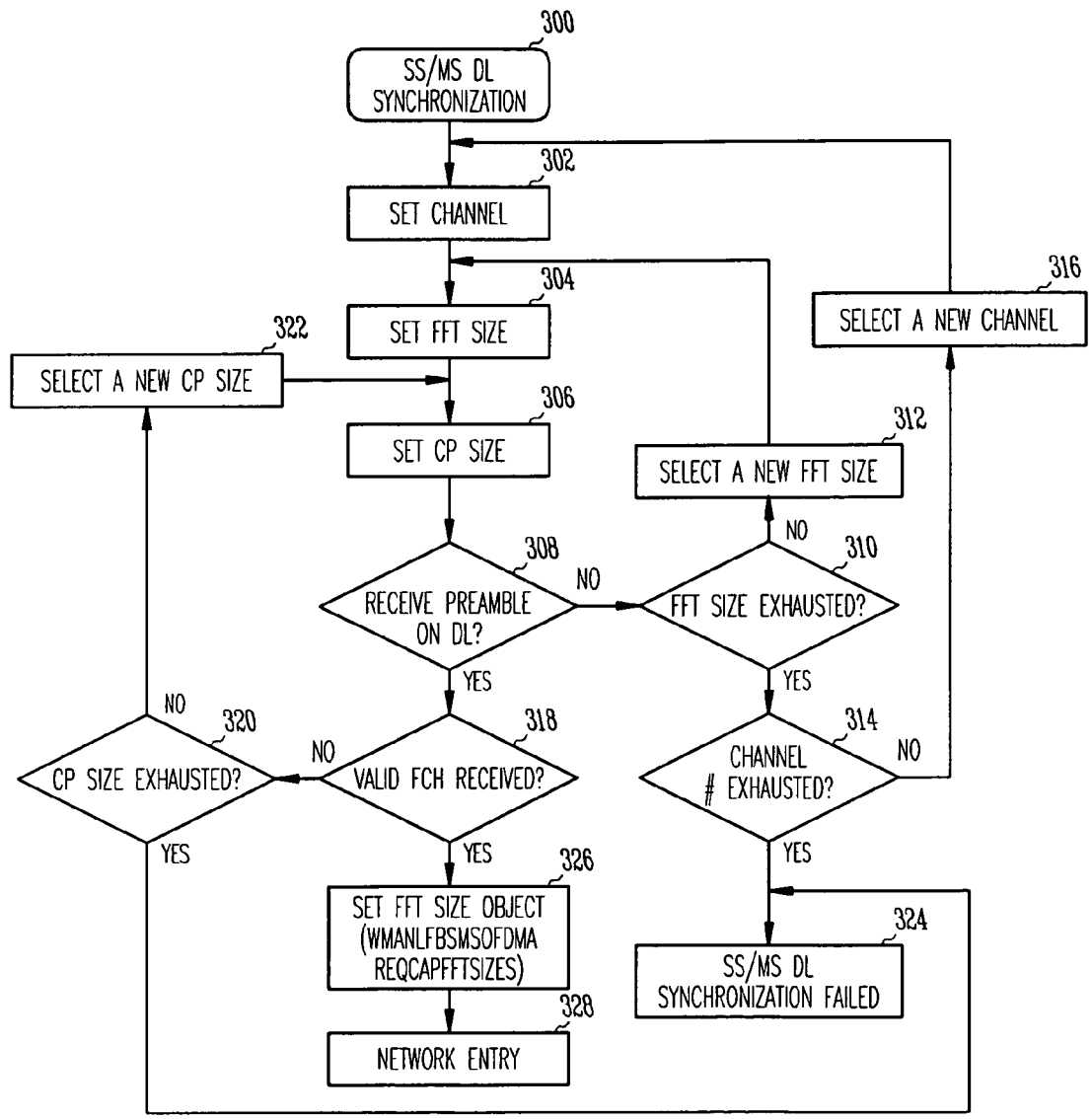
FIG. 3 is a flow chart of a downlink synchronization procedure in accordance with some embodiments of the present invention.

FIG. 3 is a flow chart of a downlink synchronization procedure in accordance with some embodiments of the present invention. Downlink synchronization procedure 300 may be performed by either mobile subscriber stations, such as mobile subscriber stations 106 (FIG. 1), or fixed subscriber stations, such as fixed subscriber stations 104 (FIG. 1), to attempt to synchronize with a base station, such as base station 102 (FIG. 1), and receive a downlink (DL) channel. As part of downlink synchronization procedure 300, a subscriber station attempts to determine the frequency channel, the FFT size and the cyclic prefix (CP) size for subsequent admission to a broadband wireless access network, such as network 100 (FIG. 1) and communication with the base station, such as base station 102 (FIG. 1).

As shown in operations 302 through 316, the subscriber station attempts to properly receive a preamble of the downlink signals from the base station for different channels and different FFT sizes. In operation 302, the subscriber station determines and sets the channel. In operation 304, the subscriber station sets the FFT size, and in operation 306, the subscriber station sets the cyclic prefix (CP) size. In operation 308, the subscriber station attempts to synchronized with and receive the preamble on the downlink (DL) using the channel, FFT size and CP size from operations 302 through 306. Once the subscriber station is able to synchronize with the preamble in operation 308, the channel and FFT size is correct. The subscriber station can then determine the proper size of the cyclic prefix in operations 318 through and 322. When the cyclic prefix is correct, the frame control header (FCH) will be received properly in operation 318. If the subscriber station exhausts all possible FFT sizes through the performance of operations 310 and 312 without being able to properly receive the downlink preamble, and when the number of channels is not exhausted, as determined in operation 314, a new channel may be selected in operation 316 allowing the synchronization to be performed on the newly selected channel. If the station exhausts all channels and FFT sizes through the performance of operations 310, 312 and 314, or if the subscriber station exhausts all possible cyclic prefixes through the performance of operations 320 and 322 without being able to receive the FCH, synchronization may fail in operation 324 and the mobile or fixed subscriber station may not be able to communicate with the base station.

When the FCH is properly received in operation 318, the subscriber station may set the FFT size object in operation 326 and may transmit a network entry request message, such as a ranging request (RNG_REQ) to the base station in operation 328.

In some embodiments, the downlink PHY data units transmitted by the base station may begin with a long preamble, which is used for PHY synchronization. The preamble may be followed by a FCH burst that contains a downlink from prefix which specifies the burst profile and length of one or several downlink bursts immediately following the FCH. When the FCH is received and decoded correctly, the CP size is set correctly.

Figure 4:
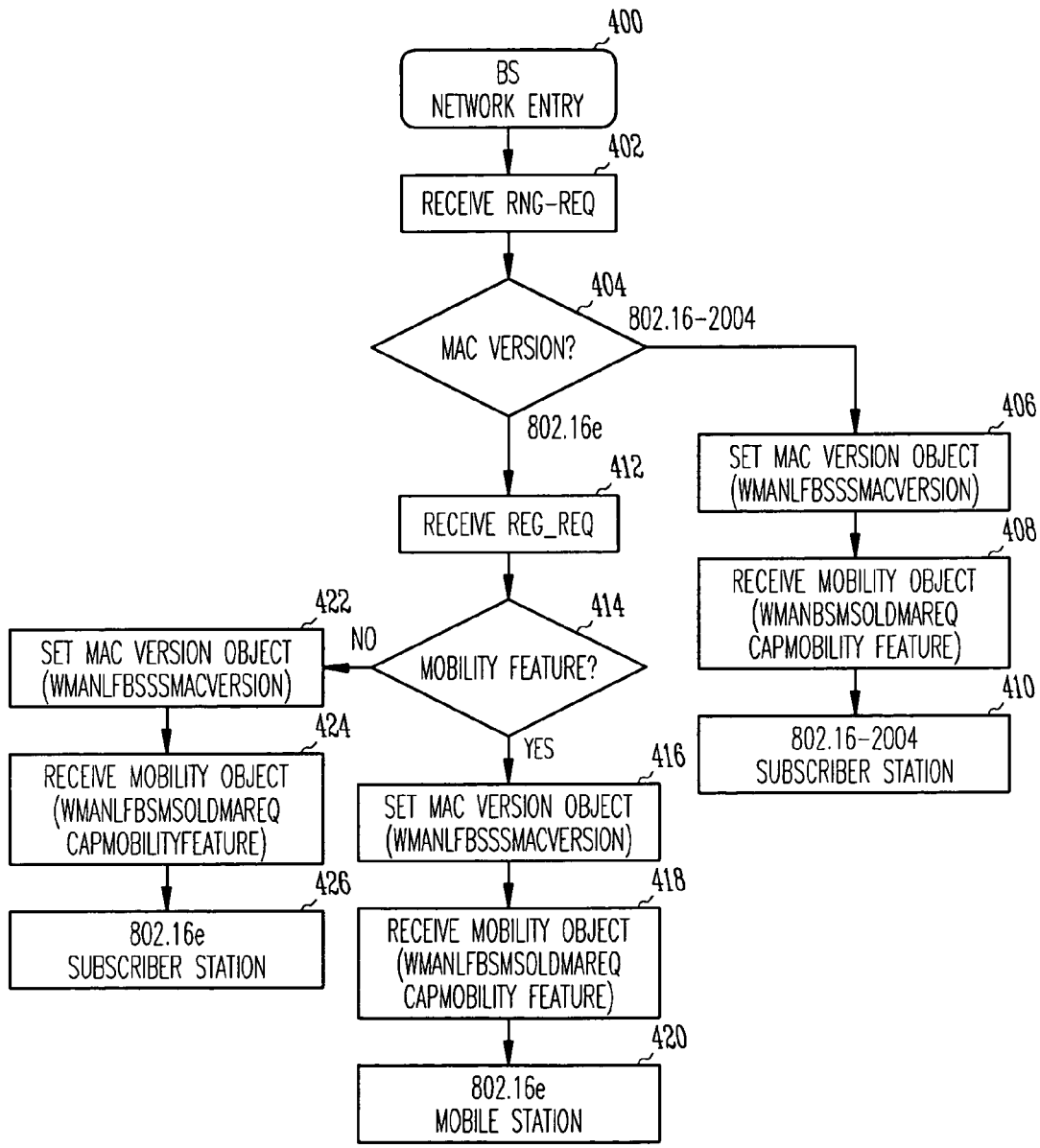
FIG. 4 is a flow chart of a base station network entry procedure in accordance with some embodiments of the present invention.

FIG. 4 is a flow chart of a base station network entry procedure in accordance with some embodiments of the present invention. Network entry procedure 400 may be performed by a base station, such as base station 102 (FIG. 1), for admitting a fixed or mobile subscriber station to the network. Procedure 400, among other things, determines the operational mode of the fixed or mobile subscriber station requesting network entry. In operation 402, a ranging request (RNG_REQ) may be received at the base station. The ranging request may have been transmitted by the subscriber or mobile subscriber station in operation 328 (FIG. 3). As part of network entry procedure 400, a base station may generate and or update its management information base 120 (FIG. 1) for the newly admitted fixed or mobile subscriber station. In operation 404, the base station determines whether the transmitting subscriber station is a station operating in accordance with the IEEE 802.16-2004 standard. If so, operations 406 through 410 are performed.

If in operation 404, the base station determines that the transmitting subscriber station is a station operating in accordance with the IEEE 802.16(e) proposed specification, a registration request (REG_REQ) may be received in operation 412. Operation 414 determines whether or not the transmitting subscriber station supports a mobility feature. If the mobility feature is supported, the transmitting station is a mobile subscriber station, such as one of mobile subscriber stations 106 (FIG. 1), and operations 416-420 are performed. If the mobility feature is not supported, the transmitting station is a fixed subscriber station, such as one of fixed subscriber stations 104 (FIG. 1), and operations 422-426 are performed.

In some embodiments, operation 406 may (described in abstract syntax notation (ASN)) set MAC version object—wmanIfBsMacVersion=ieee802 Dot16Of2004, and may set mobility object—handoverSupport, sleepModeSupport, and idleModeSupport bits in wmanIfBsMsOfdmaReqCapMobilityFeature to "0". Operation 408 may include receiving the mobility object and operation 410 may include identifying the station as an 802.16-2004 mobile station. In some embodiments, operation 416 may set MAC version object—wmanIfBsMacVersion to ieee802 Dot16e, and may set mobility object—handoverSupport, sleepModeSupport, and idleModeSupport bits in wmanIffisMsOfdmaReqCapMobilityFeature to "1". Operation 418 may include receiving the mobility object and operation 420 may include identifying the station as an 802.16e mobile station. In some embodiments, operation 422 may set MAC version object—wmanIfBsMacVersion to ieee802 Dot16e, and may set mobility object—handoverSupport, sleepModeSupport, and idleModeSupport bits in wmanIfBsMsOfdmaReqCapMobilityFeature to "0". Operation 424 may include receiving the mobility object and operation 426 may include identifying the station as an 802.16e subscriber station. These table entries are described in more detail below.

Figure 5:
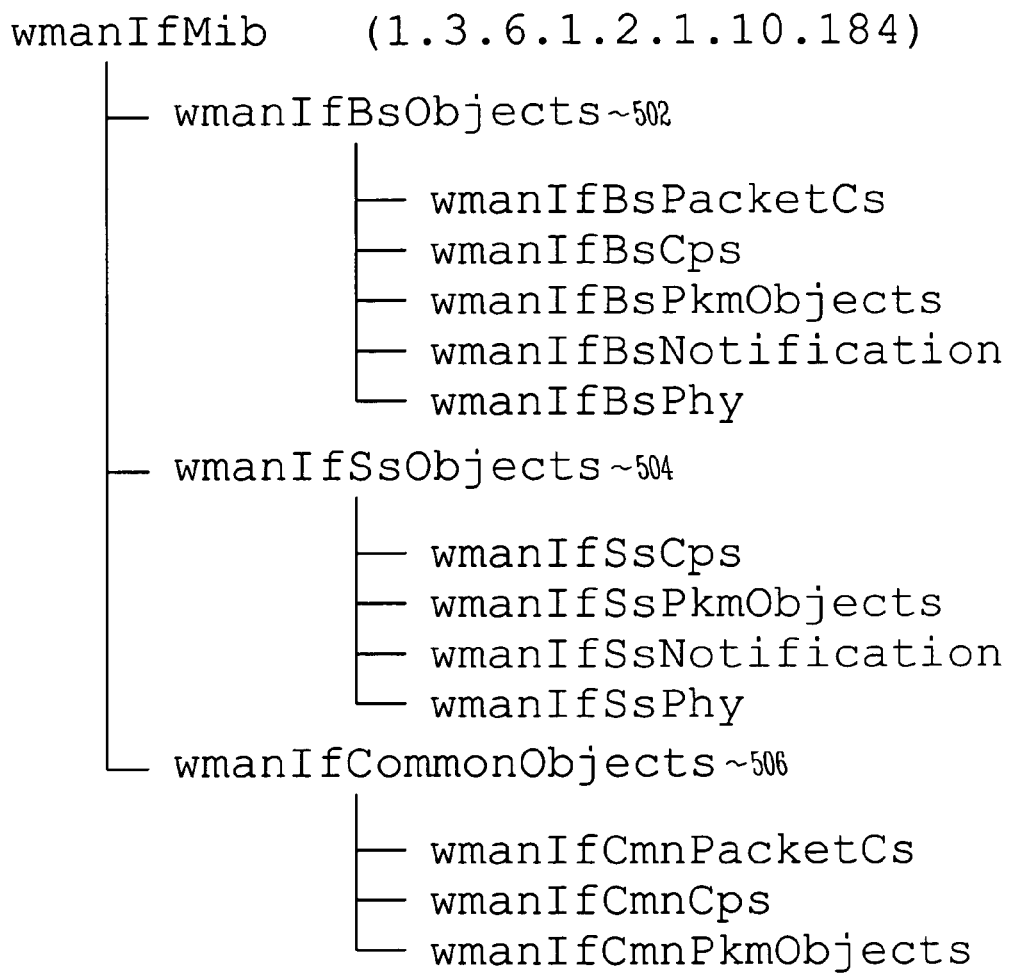
FIG. 5 illustrates an example of a management information base (MIB) structure in accordance with some embodiments of the present invention.

FIG. 5 illustrates an example of a management information base (MIB) structure in accordance with some embodiments of the present invention. MIB structure 500 (wmanIfMib) is a high level MIB which may be suitable for use with base station 102 (FIG. 1) including base stations operating in accordance with IEEE 802.16 standards, although the scope of the invention is not limited in this respect. In these example embodiments, MIB structure 500 is organized based on the reference model as defined in IEEE 802.16-2004 standard. MIB structure 500 includes of three groups: wmanIfBsObjects 502, which includes managed objects to be implemented in the SNMP agent in the base station, wmanIfSsObjects 504 which includes managed objects to be implemented in the SNMP agent in the subscriber stations, and wmanIfCommonObjects 506 which includes common managed objects to be implemented in the SNMP agent in the base station and subscriber stations. In some embodiments, MIB structure 500 may describe enhancements for IEEE 802.16f MIBs to support mobility features. The wmanIfBsCp, for example, is described in FIG. 6 below.

Figure 6:
FIG. 6 illustrates an example of a base station capabilities subtree in accordance with some embodiments of the present invention.

FIG. 6 illustrates an example of a base station capabilities subtree in accordance with some embodiments of the present invention. Base station capabilities subtree 600 includes two new tables wmanIfBsNeighborAdvertiseTable and wmanIfBsPowerSavingClassTable. WmanIfMacVersion includes an entry to indicate the 802.16(e) version of MAC software that the registered subscriber station is running. These tables and their entries are described in more detail below.

Figure 7:
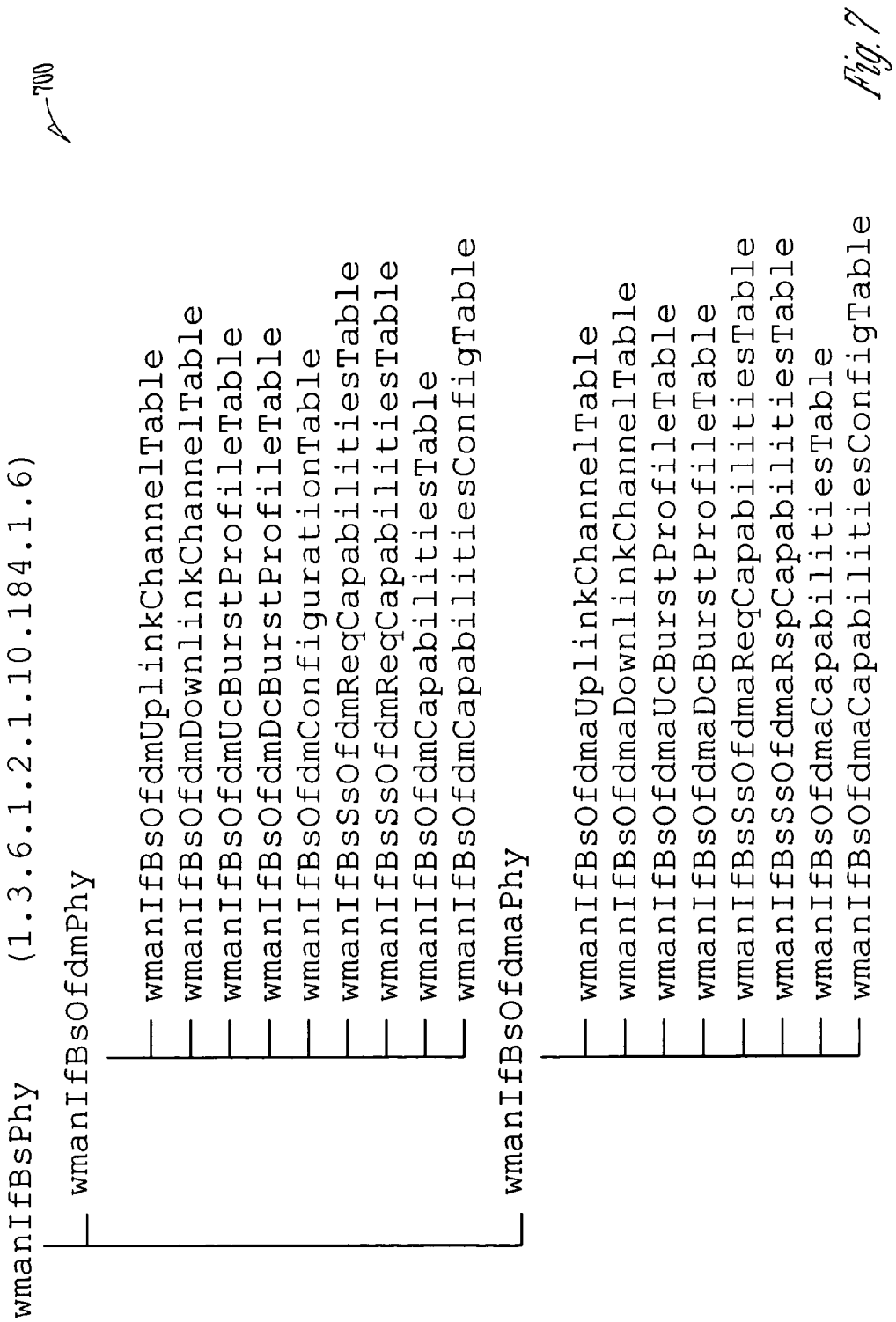
FIG. 7 illustrates an example of a base station physical (PHY) layer subtree in accordance with some embodiments of the present invention.

FIG. 7 illustrates an example of a base station physical (PHY) layer subtree in accordance with some embodiments of the present invention. Base station physical layer subtree 700 (wmanIfBsPhy subtree) includes four new tables identified as wmanIfBsSsOfdmaReqCapabilitiesTable, wmanIfBsSsOfdmaRspCapabilitiesTable, wmanIfBsOfdmaCapabilitiesTable, and wmanIfBsOfdmaCapabilitiesConfigTable. These tables and their entries are described in more detail below.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

TABLE AND FIELD DESCRIPTIONS

Below is an example of abstract syntax notation (ASN1.1) for MIB 122

WmanIfOfdmFftSizes ::= TEXTUAL-CONVENTION
STATUS current
DESCRIPTION
"This field indicates the FFT sizes supported by the SS/MS.
For each FFT size, a bit value of 0 indicates
'not supported' while 1 indicates 'supported'."
REFERENCE
"Subclause 11.8.3.6.1 in IEEE 802.16-2004"
SYNTAX BITS {fft256(0),
fft2048(1),
fft128(2),
fft512(3),
fft1024(4)}
WmanIfOfdmaMsDeModType ::= TEXTUAL-CONVENTION
STATUS current
DESCRIPTION
"This field indicates the different demodulator options
supported by a WirelessMAN-OFDMA PHY SS for downlink.
A bit value of 0 indicates 'not supported' while 1
indicates 'supported'."
REFERENCE
"Subclause 11.8.3.7.2 in IEEE 802.16(e)"
SYNTAX BITS {qam64(0),
btc(1),
ctc(2),
stc(3),
aasDiversityMapScan(4),
harqChase(5),
harqCtcIr(6),
reserved(7),
harqCcIr(8),
ldpc(9)}
WmanIfOfdmaMsModType ::= TEXTUAL-CONVENTION
STATUS current
DESCRIPTION
"This field indicates the different modulator options
supported by a WirelessMAN-OFDMA PHY SS for uplink. A bit
value of 0 indicates 'not supported' while 1 indicates
'supported'."
REFERENCE
"Subclause 11.8.3.7.3 in IEEE 802.16(e)"
SYNTAX BITS {qam64(0),
btc(1),
ctc(2),
stc(3),
harqChase(4),
ctcIr(5),
ccIr(6),

```
ldpc(7)}
WmanIfOfdmaPermutation ::= TEXTUAL-CONVENTION
STATUS current
DESCRIPTION
"This field indicates the OFDMA SS Permutation support
A bit value of 0 indicates 'not supported' while 1
indicates 'supported'."
REFERENCE
"Subclause 11.8.3.7.5 in IEEE 802.16(e)"
SYNTAX BITS {optionalPuscSupport(0),
optionalFuscSupport(1),
amcOneBySixSupport(2),
amcTwoByThreeSupport(3),
amcThreeByTwoSupport(4),
amcSupportWithHarqMap(5),
tusc1Support(6),
tusc2(7)}
WmanIfOfdmaMobility ::= TEXTUAL-CONVENTION
STATUS current
DESCRIPTION
"This field indicates whether or not the MS supports
mobility hand-over, Sleepmode, and Idle-mode. A bit
value of 0 indicates 'not supported' while 1 indicates
it is supported."
REFERENCE
"Subclause 11.8.3.7.5 in IEEE 802.16(e)"
SYNTAX BITS {handoverSupport(0),
sleepModeSupport(1),
idleModeSupport(2)}
wmanIfBsMsOfdmaReqCapabilitiesTable OBJECT-TYPE
SYNTAX SEQUENCE OF WmanIfBsMsOfdmaReqCapabilitiesEntry
MAX-ACCESS not-accessible
STATUS current
DESCRIPTION
"This table contains the basic capability information,
specific to OFDMA Phy, of MSs that have been reported by
MSs to BS using RNG-REQ, SBC-REQ and REG-REQ messages.
Entries in this table should be created when an MS
registers with a BS."
::= { wmanIfBsOfdmaPhy 5 }
wmanIfBsMsOfdmaReqCapabilitiesEntry OBJECT-TYPE
SYNTAX WmanIfBsMsOfdmaReqCapabilitiesEntry
MAX-ACCESS not-accessible
STATUS current
DESCRIPTION
"This table provides one row for each MS that has been
registered in the BS. This table augments the table
wmanIfBsRegisteredSsTable."
AUGMENTS { wmanIfBsRegisteredSsEntry }
::= { wmanIfBsMsOfdmaReqCapabilitiesTable 1 }
WmanIfBsMsOfdmaReqCapabilitiesEntry ::= SEQUENCE {
wmanIfBsMsOfdmaReqCapFftSizes WmanIfOfdmFftSizes,
wmanIfBsMsOfdmaReqCapDemodulator WmanIfOfdmaMsDeModType,
wmanIfBsMsOfdmaReqCapModulator WmanIfOfdmaMsModType,
wmanIfBsMsOfdmaReqCapPermutation WmanIfOfdmaPermutation,
wmanIfBsMsOfdmaReqCapMobilityFeature WmanIfOfdmaMobility}
wmanIfBsMsOfdmaReqCapFftSizes OBJECT-TYPE
SYNTAX WmanIfOfdmFftSizes
MAX-ACCESS read-only
STATUS current
DESCRIPTION
"This field indicates the FFT sizes supported by MS."
::= { wmanIfBsMsOfdmaReqCapabilitiesEntry 1 }
wmanIfBsMsOfdmaReqCapDemodulator OBJECT-TYPE
SYNTAX WmanIfOfdmaMsDeModType
MAX-ACCESS read-only
STATUS current
DESCRIPTION
"This field indicates the different demodulator options
supported by MS for downlink."
::= { wmanIfBsMsOfdmaReqCapabilitiesEntry 2 }
wmanIfBsMsOfdmaReqCapModulator OBJECT-TYPE
SYNTAX WmanIfOfdmaMsModType
MAX-ACCESS read-only
STATUS current
DESCRIPTION
"This field indicates the different modulator options
supported by MS for uplink."
::= { wmanIfBsMsOfdmaReqCapabilitiesEntry 3 }
wmanIfBsMsOfdmaReqCapPermutation OBJECT-TYPE
SYNTAX WmanIfOfdmaPermutation
MAX-ACCESS read-only
STATUS current
DESCRIPTION
"This field indicates the OFDMA MS Permutation support"
::= { wmanIfBsMsOfdmaReqCapabilitiesEntry 4 }
wmanIfBsMsOfdmaReqCapMobilityFeature OBJECT-TYPE
SYNTAX WmanIfOfdmaMobility
MAX-ACCESS read-only
STATUS current
DESCRIPTION
"The field indicates whether or not the MS supports
mobility hand-over, Sleepmode, and Idle-mode."
::= { wmanIfBsMsOfdmaReqCapabilitiesEntry 5 }
wmanIfBsMsOfdmaRspCapabilitiesTable OBJECT-TYPE
SYNTAX SEQUENCE OF WmanIfBsMsOfdmaRspCapabilitiesEntry
MAX-ACCESS not-accessible
STATUS current
DESCRIPTION
"This table contains the basic capability information,
specific to OFDMA Phy, of MSs that have been reported by
MSs to BS using RNG-REQ, SBC-REQ and REG-REQ messages.
Entries in this table should be created when an MS
registers with a BS."
::= { wmanIfBsOfdmaPhy 6 }
wmanIfBsMsOfdmaRspCapabilitiesEntry OBJECT-TYPE
SYNTAX WmanIfBsMsOfdmaRspCapabilitiesEntry
MAX-ACCESS not-accessible
STATUS current
DESCRIPTION
"This table provides one row for each MS that has been
registered in the BS. This table augments the table
wmanIfBsRegisteredSsTable."
AUGMENTS { wmanIfBsRegisteredSsEntry }
::= { wmanIfBsMsOfdmaRspCapabilitiesTable 1 }
WmanIfBsMsOfdmaRspCapabilitiesEntry ::= SEQUENCE {
wmanIfBsMsOfdmaRspCapFftSizes WmanIfOfdmFftSizes,
wmanIfBsMsOfdmaRspCapDemodulator WmanIfOfdmaMsDeModType,
wmanIfBsMsOfdmaRspCapModulator WmanIfOfdmaMsModType,
wmanIfBsMsOfdmaRspCapPermutation WmanIfOfdmaPermutation,
wmanIfBsMsOfdmaRspCapMobilityFeature WmanIfOfdmaMobility}
wmanIfBsMsOfdmaRspCapFftSizes OBJECT-TYPE
SYNTAX WmanIfOfdmFftSizes
MAX-ACCESS read-only
STATUS current
DESCRIPTION
"This field indicates the FFT sizes negotiated with the
MS."
::= { wmanIfBsMsOfdmaRspCapabilitiesEntry 1 }
wmanIfBsMsOfdmaRspCapDemodulator OBJECT-TYPE
SYNTAX WmanIfOfdmaMsDeModType
MAX-ACCESS read-only
STATUS current
DESCRIPTION
"This field indicates the different demodulator options
negotiated for MS for downlink."
::= { wmanIfBsMsOfdmaRspCapabilitiesEntry 2 }
wmanIfBsMsOfdmaRspCapModulator OBJECT-TYPE
SYNTAX WmanIfOfdmaMsModType
MAX-ACCESS read-only
STATUS current
DESCRIPTION
"This field indicates the different modulator options
negotiated for MS for uplink."
::= { wmanIfBsMsOfdmaRspCapabilitiesEntry 3 }
wmanIfBsMsOfdmaRspCapPermutation OBJECT-TYPE
SYNTAX WmanIfOfdmaPermutation
MAX-ACCESS read-only
STATUS current
DESCRIPTION
"This field indicates the OFDMA MS Permutation support
negotiated for MS."
::= { wmanIfBsMsOfdmaRspCapabilitiesEntry 4 }
wmanIfBsMsOfdmaRspCapMobilityFeature OBJECT-TYPE
SYNTAX WmanIfOfdmaMobility
MAX-ACCESS read-only
STATUS current
```

-continued

```
DESCRIPTION
"The field indicates the mobility hand-over, Sleepmode,
and Idle-mode negotiated for MS."
::= { wmanIfBsMsOfdmaRspCapabilitiesEntry 5 }
wmanIfBsOfdmaCapabilitiesTable OBJECT-TYPE
SYNTAX SEQUENCE OF WmanIfBsOfdmaCapabilitiesEntry
MAX-ACCESS not-accessible
STATUS current
DESCRIPTION
"This table contains the basic capabilities, specific to
OFDMA Phy, of the BS as implemented in BS hardware and
software. These capabilities along with the configuration
for them (wmanIfBsOfdmaCapabilitiesConfigTable) are used
for negotiation of basic capabilities with SS using
RNG-RSP, SBC-RSP and REG-RSP messages. The negotiated
capabilities are obtained by interSubclause of MS raw
reported capabilities, BS raw capabilities and BS
configured capabilities. The objects in the table have
read-only access. The table is maintained by BS."
::= { wmanIfBsOfdmaPhy 7 }
wmanIfBsOfdmaCapabilitiesEntry OBJECT-TYPE
SYNTAX WmanIfBsOfdmaCapabilitiesEntry
MAX-ACCESS not-accessible
STATUS current
DESCRIPTION
"This table provides one row for each BS sector and is
indexed by ifIndex."
INDEX { ifIndex }
::= { wmanIfBsOfdmaCapabilitiesTable 1 }
WmanIfBsOfdmaCapabilitiesEntry ::= SEQUENCE {
wmanIfBsOfdmaCapFftSizes WmanIfOfdmFftSizes,
wmanIfBsOfdmaCapDemodulator WmanIfOfdmaMsDeModType,
wmanIfBsOfdmaCapModulator WmanIfOfdmaMsModType,
wmanIfBsOfdmaCapPermutation WmanIfOfdmaPermutation,
wmanIfBsOfdmaCapMobilityFeature WmanIfOfdmaMobility}
wmanIfBsOfdmaCapFftSizes OBJECT-TYPE
SYNTAX WmanIfOfdmFftSizes
MAX-ACCESS read-only
STATUS current
DESCRIPTION
"This field indicates the FFT sizes supported by BS."
::= { wmanIfBsOfdmaCapabilitiesEntry 1 }
wmanIfBsOfdmaCapDemodulator OBJECT-TYPE
SYNTAX WmanIfOfdmaMsDeModType
MAX-ACCESS read-only
STATUS current
DESCRIPTION
"This field indicates the different demodulator options
supported by BS."
::= { wmanIfBsOfdmaCapabilitiesEntry 2 }
wmanIfBsOfdmaCapModulator OBJECT-TYPE
SYNTAX WmanIfOfdmaMsModType
MAX-ACCESS read-only
STATUS current
DESCRIPTION
"This field indicates the different modulator options
supported by BS."
::= { wmanIfBsOfdmaCapabilitiesEntry 3 }
wmanIfBsOfdmaCapPermutation OBJECT-TYPE
SYNTAX WmanIfOfdmaPermutation
MAX-ACCESS read-only
STATUS current
DESCRIPTION
"This field indicates the OFDMA MS Permutation support
supported by BS."
::= { wmanIfBsOfdmaCapabilitiesEntry 4 }
wmanIfBsOfdmaCapMobilityFeature OBJECT-TYPE
SYNTAX WmanIfOfdmaMobility
MAX-ACCESS read-only
STATUS current
DESCRIPTION
"The field indicates the mobility hand-over, Sleepmode,
and Idle-mode supported by BS."
::= { wmanIfBsOfdmaCapabilitiesEntry 5 }
wmanIfBsOfdmaCapabilitiesConfigTable OBJECT-TYPE
SYNTAX SEQUENCE OF WmanIfBsOfdmaCapabilitiesConfigEntry
MAX-ACCESS not-accessible
STATUS current
DESCRIPTION
"This table contains the configuration for basic
capabilities of BS, specific to OFDMA Phy. The table is
intended to be used to restrict the Capabilities
implemented by BS, for example in order to comply with
local regulatory requirements. The BS should use the
configuration along with the implemented Capabilities
(wmanIfBsOfdmaPhyTable) for negotiation of basic
capabilities with SS using RNG-RSP, SBC-RSP and REG-RSP
messages. The negotiated capabilities are obtained by
interSubclause of MS reported capabilities, BS raw
capabilities and BS configured capabilities. The objects
in the table have read-write access. The rows are created
by BS as a copy of wmanIfBsBasicCapabilitiesTable
and can be modified by NMS."
::= { wmanIfBsOfdmaPhy 8 }
wmanIfBsOfdmaCapabilitiesConfigEntry OBJECT-TYPE
SYNTAX WmanIfBsOfdmaCapabilitiesConfigEntry
MAX-ACCESS not-accessible
STATUS current
DESCRIPTION
"This table provides one row for each BS sector and is
indexed by ifIndex."
INDEX { ifIndex }
::= { wmanIfBsOfdmaCapabilitiesConfigTable 1 }
WmanIfBsOfdmaCapabilitiesConfigEntry ::= SEQUENCE {
wmanIfBsOfdmaCapCfgFftSizes WmanIfOfdmFftSizes,
wmanIfBsOfdmaCapCfgDemodulator WmanIfOfdmaMsDeModType,
wmanIfBsOfdmaCapCfgModulator WmanIfOfdmaMsModType,
wmanIfBsOfdmaCapCfgPermutation WmanIfOfdmaPermutation,
wmanIfBsOfdmaCapCfgMobilityFeature WmanIfOfdmaMobility}
wmanIfBsOfdmaCapCfgFftSizes OBJECT-TYPE
SYNTAX WmanIfOfdmFftSizes
MAX-ACCESS read-only
STATUS current
DESCRIPTION
"This field indicates the FFT sizes configured for the BS."
::= { wmanIfBsOfdmaCapabilitiesConfigEntry 1 }
wmanIfBsOfdmaCapCfgDemodulator OBJECT-TYPE
SYNTAX WmanIfOfdmaMsDeModType
MAX-ACCESS read-only
STATUS current
DESCRIPTION
"This field indicates the different demodulator options
configured for the BS."
::= { wmanIfBsOfdmaCapabilitiesConfigEntry 2 }
wmanIfBsOfdmaCapCfgModulator OBJECT-TYPE
SYNTAX WmanIfOfdmaMsModType
MAX-ACCESS read-only
STATUS current
DESCRIPTION
"This field indicates the different modulator options
configured for the BS."
::= { wmanIfBsOfdmaCapabilitiesConfigEntry 3 }
wmanIfBsOfdmaCapCfgPermutation OBJECT-TYPE
SYNTAX WmanIfOfdmaPermutation
MAX-ACCESS read-only
STATUS current
DESCRIPTION
"This field indicates the OFDMA MS Permutation support
configured for the BS."
::= { wmanIfBsOfdmaCapabilitiesConfigEntry 4 }
wmanIfBsOfdmaCapCfgMobilityFeature OBJECT-TYPE
SYNTAX WmanIfOfdmaMobility
MAX-ACCESS read-only
STATUS current
DESCRIPTION
"The field indicates the mobility hand-over, Sleepmode,
and Idle-mode configured for the BS."
::= { wmanIfBsOfdmaCapabilitiesConfigEntry 5 }

WmanIfMacVersion ::= TEXTUAL-CONVENTION
STATUS current
DESCRIPTION
"Version number of IEEE 802.16."
SYNTAX INTEGER {ieee802Dot16Of2001(1),
```

-continued

```
ieee802Dot16cOf2002(2),
ieee802Dot16aOf2003(3),
ieee802Dot16Of2004(4),
ieee802Dot16e(5)}
wmanIfBsRegisteredSsTable OBJECT-TYPE
SYNTAX SEQUENCE OF WmanIfBsRegisteredSsEntry
MAX-ACCESS not-accessible
STATUS current
DESCRIPTION
"This table contains the basic capability information
of SSs that have been negotiated and agreed between
BS and SS via REG-REQ and REG-RSP messages. An entry
in this table indicates the SS has entered and registered
into the BS."
REFERENCE
"Subclause 6.3.2.3.7 in IEEE 802.16-2004"
::= { wmanIfBsCps 1 }
wmanIfBsRegisteredSsEntry OBJECT-TYPE
SYNTAX WmanIfBsRegisteredSsEntry
MAX-ACCESS not-accessible
STATUS current
DESCRIPTION
"This table provides one row for each SS that has been
registered in the BS, and is indexed by
wmanIfBsSsMacAddress. The primary index is the ifIndex
with an ifType of propBWAp2Mp, indicating the BS sector
with which the SS is associated. wmanIfBsSsMacAddress
identifies the SS being registered."
INDEX { ifIndex, wmanIfBsSsMacAddress }
::= { wmanIfBsRegisteredSsTable 1 }
WmanIfBsRegisteredSsEntry ::= SEQUENCE {
wmanIfBsSsMacAddress MacAddress,
wmanIfBsSsBasicCid WmanIfCidType,
wmanIfBsSsPrimaryCid WmanIfCidType,
wmanIfBsSsSecondaryCid WmanIfCidType,
wmanIfBsSsManagementSupport INTEGER,
wmanIfBsSsIpManagementMode INTEGER,
wmanIfBsSs2ndMgmtArqEnable TruthValue,
wmanIfBsSs2ndMgmtArqWindowSize INTEGER,
wmanIfBsSs2ndMgmtArqDnLinkTxDelay INTEGER,
wmanIfBsSs2ndMgmtArqUpLinkTxDelay INTEGER,
wmanIfBsSs2ndMgmtArqDnLinkRxDelay INTEGER,
wmanIfBsSs2ndMgmtArqUpLinkRxDelay INTEGER,
wmanIfBsSs2ndMgmtArqBlockLifetime INTEGER,
wmanIfBsSs2ndMgmtArqSyncLossTimeout INTEGER,
wmanIfBsSs2ndMgmtArqDeliverInOrder TruthValue,
wmanIfBsSs2ndMgmtArqRxPurgeTimeout INTEGER,
wmanIfBsSs2ndMgmtArqBlockSize INTEGER,
wmanIfBsSsVendorIdEncoding OCTET STRING,
wmanIfBsSsAasBroadcastPermission INTEGER,
wmanIfBsSsMaxTxPowerBpsk WmanIfMaxTxPowerType,
wmanIfBsSsMaxTxPowerQpsk WmanIfMaxTxPowerType,
wmanIfBsSsMaxTxPower16Qam WmanIfMaxTxPowerType,
wmanIfBsSsMaxTxPower64Qam WmanIfMaxTxPowerType,
wmanIfBsSsMacVersion WmanIfMacVersion}
wmanIfBsSsMacAddress OBJECT-TYPE
SYNTAX MacAddress
MAX-ACCESS not-accessible
STATUS current
DESCRIPTION
"The MAC address of SS is received from the RNG-REQ
message. When SS registers, this MAC address is entered
into the table, and used as the identifier to the SS."
REFERENCE
"Subclause 6.3.2.3.5 in IEEE 802.16-2004"
::= { wmanIfBsRegisteredSsEntry 1 }
wmanIfBsSsMacVersion OBJECT-TYPE
SYNTAX WmanIfMacVersion
MAX-ACCESS read-only
STATUS current
DESCRIPTION
"This parameter specifies the version of 802.16 to which the
message originator conforms."
REFERENCE
"Subclause 11.1.3 in IEEE 802.16-2004"
::= { wmanIfBsRegisteredSsEntry 24 }
```

Below is an example of the ASN.1 text for a mobile MIB and may include references to one of the IEEE 802.16 standards.

Below are some examples of listings and descriptions for the various tables used in the figures of this patent application and may include references to one of the IEEE 802.16 standards.

| wmanIfBsRegisteredSsTable |
|---|
| WmanIfMacVersion includes a new type of ieee802Dot16e to indicate the registered SS is running the 802.16(e) version of MAC software. |

| |
|---|
| WmanIfMacVersion ::= TEXTUAL-CONVENTION<br>STATUS current<br>DESCRIPTION<br>"Version number of IEEE 802.16."<br>SYNTAX INTEGER {ieee802Dot16Of2001(1),<br>ieee802Dot16cOf2002(2),<br>ieee802Dot16aOf2003(3),<br>ieee802Dot16Of2004(4),<br>ieee802Dot16e} |

| wmanIfBsConfigurationTable |
|---|
| wmanIfBsConfigurationTable includes additional BS objects as defined in subclause 10.1. These parameters are associated with power saving mode and handoff. |

| |
|---|
| MOB-NBR-ADV interval<br>ASC-AGING-TIMER<br>Paging Retry Count<br>Mode Selection Feedback processing time<br>Idle Mode System Timer For<br>Management Resource Holding Timer<br>DREG Command Retry Count<br>T46<br>T47<br>Paging Interval Length<br>Max Dir Scan Time<br>SAChallengeTimer<br>SATEKTimer<br>SATEKRequestMaxResends |

| wmanIfBsSsReqCapabilitiesTable, wmanIfBsSsRspCapabilitiesTable, and wmanIfBsBasicCapabilitiesTable include additional objects, defined in 11.7.7 and 11.7.8. |
|---|
| Maximum amount of MAC level data per DL frame<br>Maximum amount of MAC level data per UL framet<br>Packing support<br>MAC Extended rtPS support<br>Maximum number of bursts transmitted concurrently to the MS<br>CID update encodings<br>Method for allocating IP address for the secondary management connection<br>System Resource_Retain_Time<br>HO Process Optimization MS Timer<br>MS Handover Retransmission Timer<br>Mobility features supported<br>Sleep-mode recovery time<br>MS-PREV-IP-ADDR<br>SKIP-ADDR-ACQUISITION<br>SAID update encodings<br>Total number of provisioned service flow<br>Idle Mode Timeout<br>SA TEK Update<br>GKEK Parameters<br>ARQ-ACK Type<br>HO parameters processing time<br>MAC header and extended subheader support<br>SN Reporting Base<br>OFDM private map support<br>Uplink control channel support<br>Maximum number of burst per frame capability in HARQ<br>HARQ buffer capability |

-continued wmanIfBsSsReqCapabilitiesTable, wmanIfBsSsRspCapabilitiesTable, and wmanIfBsBasicCapabilitiesTable include additional objects, defined in 11.7.7 and 11.7.8.

HARQ incremental redundancy buffer capability
HARQ Chase combining and CC-IR buffer capability
PKM Version Support
Authorization policy support
MAC (Message Authentication Code) Mode
PN window size
Power save class types capability
Extension capability
HO Trigger metric support
Association type support wmanIfBsNeighborAdvertiseTable
wmanIfBsNeighborAdvertiseTable includes objects defined in Table 384b.

Operator ID
Bandwidth
FFT Size
Cycle prefix (CP)
Frame duration code
FA Index wmanIfBsPowerSavingClassTable
wmanIfBsPowerSavingClassTable includes objects as defined in Table 364a.

Power_Saving_Class_ID
Power_Saving_Class_Type
Start_frame_number 4
initial-sleep window 5 1 Initial-sleep window
listening window
final-sleep window base
final-sleep window exponent
SLPID
CID
Direction wmanIfBsOfdmaPhy
wmanIfBsOfdmaPhy is a group containing objects specific to OFDMA PHY
wmanIfBsOfdmaUplinkChannelTable
wmanIfBsOfdmaUplinkChannelTable includes additional objects associated UCD channel encodings

TABLE 349

Initial_ranging_backoff_start
Initial_ranging_backoff_end
Bandwidth_request_backoff_start
Bandwidth_request_backoff_end
Uplink_burst_profile for multiple FEC types
Normalized C/N override TABLE 353a LowerBoundAAS_PREAMBLE
UpperBoundAAS_PREAMBLE
UL allocated subchannel bitmap for optimal AMC permutation
Allow AAS Beam Select Messages
Use CQICH indication flag
MS-specific up power offset adjustment step
MS-specific down power offset adjustment step TABLE 353a-continued Minimum level of power offset adjustment
Maximum level of power offset adjustment
Handover Ranging Codes
Initial ranging interval
Normalized C/N for Channel Sounding wmanIfBsOfdmaDownlinkChannelTable includes additional objects.

DL region definition
HO type support
H_Add Threshold
H_Delete Threshold
ASR(Anchor Switch Report) Slot Length (M) and Switching Period (L)
Paging Group ID
DL allocated subchannel bitmap for optional AMC permutation
TUSC1 permutation active subchannels bitmap
TUSC2 permutation active subchannels bitmap
Hysteresis margin
Time-to-Trigger duration
Trigger
N + I
MAC version
Downlink_burst_profile for multiple FEC types
BS Restart Count WmanIfBsOfdmaUcdBurstProfileTable As per Table 357, the definition of FEC Code type and modulation type object in wmanIfBsOfdmaUcdBurstProfileTable shall be changed as the following.

0 = QPSK (CC) ½
1 = QPSK (CC) ¾
2 = 16-QAM (CC) ½
3 = 16-QAM (CC) ¾
4 = 64-QAM (CC) ½
5 = 64-QAM (CC) ⅔
6 = 64-QAM (CC) ¾
7 = QPSK (BTC) ½
8 = QPSK (BTC) ¾
9 = 16-QAM (BTC) ⅗
10 = 16-QAM (BTC) ⅘
11 = 64-QAM (BTC) ⅝
12 = 64-QAM (BTC) ⅘
13 = QPSK (CTC) ½
14 = QPSK (CTC) ¾
15 = 16-QAM (CTC) ½
16 = 16-QAM (CTC) ¾
17 = 64-QAM (CTC) ½
18 = 64-QAM (CTC) ⅔
19 = 64-QAM (CTC) ¾
20 = 64-QAM (CTC) ⅚
21 = QPSK (ZT CC) ½
22 = QPSK (ZT CC) ¾
23 = 16-QAM (ZT CC) ½
24 = 16-QAM (ZT CC) ¾
25 = 64-QAM (ZT CC) ½
26 = 64-QAM (ZT CC) ⅔
27 = 64-QAM (ZT CC) ¾
28 = QPSK (LDPC) ½
29 = QPSK (LDPC) ⅔ A code
30 = QPSK (LDPC) ¾ A code
31 = 16-QAM (LDPC) ½
32 = 16-QAM (LDPC) ⅔ A code
33 = 16-QAM (LDPC) ¾ A code
34 = 64-QAM (LDPC) ½
35 = 64-QAM (LDPC) ⅔ A code
36 = 64-QAM (LDPC) ¾ A code
37 = QPSK (LDPC) ⅔ B code
38 = QPSK (LDPC) ¾ B code
39 = 16-QAM (LDPC) ⅔ B code
40 = 16-QAM (LDPC) ¾ B code
41 = 64-QAM (LDPC) ⅔ B code
42 = 64-QAM (LDPC) ¾ B code
43 = QPSK (LDPC) ⅚

-continued

WmanIfBsOfdmaUcdBurstProfileTable As per Table 357, the definition of FEC Code type and modulation type object in wmanIfBsOfdmaUcdBurstProfileTable shall be changed as the following.

44 = 16-QAM(LDPC) ⅚
45 = 64-QAM(LDPC) ⅚ wmanIfBsOfdmaDcdBurstProfileTable As per Table 363, the definition of FEC Code type object in wmanIfBsOfdmaDcdBurstProfileTable shall be changed as the following 0 = QPSK (CC) ½
1 = QPSK (CC) ¾
2 = 16-QAM (CC) ½
3 = 16-QAM (CC) ¾
4 = 64-QAM (CC) ½
5 = 64-QAM (CC) ⅔
6 = 64-QAM (CC) ¾
7 = QPSK (BTC) ½
8 = QPSK (BTC) ¾
9 = 16-QAM (BTC) ⅗
10 = 16-QAM (BTC) ⅘
11 = 64-QAM (BTC) ⅝
12 = 64-QAM (BTC) ⅘
13 = QPSK (CTC) ½
14 = QPSK (CTC) ¾
15 = 16-QAM (CTC) ½
16 = 16-QAM (CTC) ¾
17 = 64-QAM (CTC) ½
18 = 64-QAM (CTC) ⅔
19 = 64-QAM (CTC) ¾
20 = 64-QAM (CTC) ⅚
21 = QPSK (ZT CC) ½
22 = QPSK (ZT CC) ¾
23 = 16-QAM (ZT CC) ½
24 = 16-QAM (ZT CC) ¾
25 = 64-QAM (ZT CC) ½
26 = 64-QAM (ZT CC) ⅔
27 = 64-QAM (ZT CC) ¾
28 = QPSK (LDPC) ½
29 = QPSK (LDPC) ⅔ A code
30 = QPSK (LDPC) ¾ A code
31 = 16-QAM (LDPC) ½
32 = 16-QAM (LDPC) ⅔ A code
33 = 16-QAM (LDPC) ¾ A code
34 = 64-QAM (LDPC) ½
35 = 64-QAM (LDPC) ⅔ A code
36 = 64-QAM (LDPC) ¾ A code
37 = QPSK (LDPC) ⅔ B code
38 = QPSK (LDPC) ¾ B code
39 = 16-QAM (LDPC) ⅔ B code
40 = 16-QAM (LDPC) ¾ B code
41 = 64-QAM (LDPC) ⅔ B code
42 = 64-QAM (LDPC) ¾ B code
43 = QPSK (LDPC) ⅚
44 = 16-QAM(LDPC) ⅚
45 = 64-QAM(LDPC) ⅚ wmanIfBsSsOfdmaReqCapabilitiesTable includes the following objects:

OFDMA MS FFT sizes
OFDMA SS demodulator
OFDMA SS modulator
OFDMA SS Permutation support
OFDMA AAS private map support
OFDMA SS uplink power control support
OFDMA MAP Capability
OFDMA MS CSIT capability
OFDMA SS Demodulator for MIMO Support
OFDMA SS Modulator for MIMO Support
SDMA Pilot capability
OFDMA Multiple Downlink Burst Profile Capability wmanIfBsSsOfdmaRspCapabilitiesTable includes the following objects:

OFDMA MS FFT sizes
OFDMA SS demodulator
OFDMA SS modulator
OFDMA SS Permutation support
OFDMA AAS private map support
OFDMA SS uplink power control support
OFDMA MAP Capability
OFDMA MS CSIT capability
OFDMA SS Demodulator for MIMO Support
OFDMA SS Modulator for MIMO Support
SDMA Pilot capability
OFDMA Multiple Downlink Burst Profile Capability wmanIfBsOfdmaCapabilitiesTable includes the following objects:

OFDMA MS FFT sizes
OFDMA SS demodulator
OFDMA SS modulator
OFDMA SS Permutation support
OFDMA AAS private map support
OFDMA SS uplink power control support
OFDMA MAP Capability
OFDMA MS CSIT capability
OFDMA SS Demodulator for MIMO Support
OFDMA SS Modulator for MIMO Support
SDMA Pilot capability
OFDMA Multiple Downlink Burst Profile Capability wmanIfBsOfdmaCapabilitiesConfigTable includes the following objects:

OFDMA MS FFT sizes
OFDMA SS demodulator
OFDMA SS modulator
OFDMA SS Permutation support
OFDMA AAS private map support
OFDMA SS uplink power control support
OFDMA MAP Capability
OFDMA MS CSIT capability
OFDMA SS Demodulator for MIMO Support
OFDMA SS Modulator for MIMO Support
SDMA Pilot capability
OFDMA Multiple Downlink Burst Profile Capability wmanIfSsConfigurationTable includes additional MS objects as defined in subclause 10.1. These parameters are associated with power saving mode and handoff.

Min_Sleep_Interval
MS Max_Sleep_Interval
MS Listening_Interval
ASC-AGING-TIMER
Serving BS ID AGINGTIMER
T42
Fast-Tracking Response Processing Time
Mode Selection Feedback processing time
Idle Mode Timer
T43
T44
T45
DREG Request Retry Count
HO Process Optimization MS Timer Retries
Paging Interval Length
Max Dir Scan Time
SAChallengeTimer
SATEKTimer
SATEKRequestMaxResends wmanIfSsOfdmaPhy is a group containing objects specific to OFDMA PHY.
wmanIfBsOfdmaUplinkChannelTable includes additional objects associated UCD channel encodings

TABLE 349

HO_ranging_start
HO_ranging_end
Initial_ranging_backoff_start
Initial_ranging_backoff_end
Bandwidth_request_backoff_start
Bandwidth_request_backoff_end
Uplink_burst_profile for multiple FEC types
Normalized C/N override TABLE 353a LowerBoundAAS_PREAMBLE
UpperBoundAAS_PREAMBLE
UL allocated subchannel bitmap for optimal AMC permutation
Allow AAS Beam Select Messages
Use CQICH indication flag
MS-specific up power offset adjustment step
MS-specific down power offset adjustment step
Minimum level of power offset adjustment
Maximum level of power offset adjustment
Handover Ranging Codes
Initial ranging interval
Normalized C/N for Channel Sounding In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method for managing fixed and mobile subscriber stations in a broadband wireless access network, comprising:
    receiving, by a base station in an Institute of Electrical and Electronics Engineers (IEEE) 802.16(e) broadband wireless access network comprising IEEE 802.16-2004 network support, a registration request from a subscriber station;
    determining from the registration request if a mobility feature is supported by the subscriber station;
    setting a media access control (MAC) version object to a configuration for a mobile subscriber station if said determining from the registration request determines that the mobility feature is supported by the subscriber station;
    setting the MAC version object to a configuration for a fixed subscriber station if said determining from the registration request determines that the mobility feature is not supported by the subscriber station; and
    communicating with the subscriber station using parameters based on the selected configuration.

2. The method of claim 1, comprising:
    receiving a ranging request;
    determining from the ranging request whether the subscriber station operates in compliance with the standard IEEE 802.16-2004;
    setting the MAC version object to a configuration for a subscriber station compliant with the standard IEEE 802.16-2004 if said determining from the ranging request determines that the subscriber station operates in compliance with the standard IEEE 802.16-2004.

3. The method of claim 2, wherein the subscriber station operating in compliance with the standard IEEE 802.16-2004 can operate with OFDM 256 and OFMDA 2048.

4. The method of claim 1, wherein said setting the MAC version object to a configuration for a mobile subscriber station comprises setting the MAC version object to a configuration for a mobile subscriber station compliant with standard IEEE 802.16(e).

5. The method of claim 4, wherein the mobile subscriber station operating in compliance with the standard IEEE 802.16(e) can operate with FFT sizes of 1024, 512, and 128.

6. The method of claim 1, wherein said setting the MAC version object to a configuration for a fixed subscriber station comprises setting the MAC version object to a configuration for a fixed subscriber station compliant with standard IEEE 802.16(e).

7. The method of claim 6, wherein the fixed subscriber station operating in compliance with the standard IEEE 802.16(e) can operate with FFT sizes of 1024, 512, and 128.

8. An apparatus for managing fixed and mobile subscriber stations in a broadband wireless access network, comprising a base station of an Institute of Electrical and Electronics Engineers (IEEE) 802.16(e) broadband wireless access network comprising IEEE 802.16-2004 network support, the base station having an antenna, a PHY portion, and a MAC portion, the base station to:
    receive a registration request from a subscriber station;
    determine from the registration request if a mobility feature is supported by the subscriber station;
    set a media access control (MAC) version object to a configuration for a mobile subscriber station if said determining from the registration request determines that the mobility feature is supported by the subscriber station;
    set the MAC version object to a configuration for a fixed subscriber station if said determining from the registration request determines that the mobility feature is not supported by the subscriber station; and
    communicate with the subscriber station using parameters based on the selected configuration.

9. The apparatus of claim 8, wherein the base station is further to:
    receive a ranging request;
    determine from the ranging request whether the subscriber station operates in compliance with the standard IEEE 802.16-2004; and
    set the MAC version object to a configuration for a subscriber station compliant with the standard IEEE 802.16-2004 if said determining from the ranging request determines that the subscriber station operates in compliance with the standard IEEE 802.16-2004.

10. The apparatus of claim 9, wherein the subscriber station operating in compliance with the standard IEEE 802.16-2004 can operate with OFDM 256 and OFMDA 2048.

11. The apparatus of claim 8, wherein the configuration for a mobile subscriber station comprises a configuration for a mobile subscriber station compliant with standard IEEE 802.16(e).

12. The apparatus of claim 11, wherein the mobile subscriber station compliant with the standard IEEE 802.16(e) can operate with FFT sizes of 1024, 512, and 128.

13. The apparatus of claim 8, wherein the configuration for a fixed subscriber station comprises a configuration for a fixed subscriber station compliant with standard IEEE 802.16(e).

14. The apparatus of claim 13, wherein the fixed subscriber station compliant with the standard IEEE 802.16(e) can operate with FFT sizes of 1024, 512, and 128.

15. An article comprising a non-transitory computer-readable medium with instructions stored thereon, which when executed by at least one processor perform operations comprising:
  receiving, by a base station in an Institute of Electrical and Electronics Engineers (IEEE) 802.16(e) broadband wireless access network comprising IEEE 802.16-2004 network support, a registration request from a subscriber station;
  determining from the registration request if a mobility feature is supported by the subscriber station;
  setting a media access control (MAC) version object to a configuration for a mobile subscriber station if said determining from the registration request determines that the mobility feature is supported by the subscriber station;
  setting the MAC version object to a configuration for a fixed subscriber station if said determining from the registration request determines that the mobility feature is not supported by the subscriber station; and
  communicating with the subscriber station using parameters based on the selected configuration.

16. The article of claim 15, wherein the operations further comprise:
  receiving a ranging request;
  determining from the ranging request whether the subscriber station operates in compliance with the standard IEEE 802.16-2004;
  setting the MAC version object to a configuration for a subscriber station compliant with the standard IEEE 802.16-2004 if said determining from the ranging request determines that the subscriber station operates in compliance with the standard IEEE 802.16-2004.

17. The article of claim 16, wherein the subscriber station operating in compliance with the standard IEEE 802.16-2004 can operate with OFDM 256 and OFMDA 2048.

18. The article of claim 15, wherein the operation of setting the MAC version object to a configuration for a mobile subscriber station comprises setting the MAC version object to a configuration for a mobile subscriber station compliant with standard IEEE 802.16(e).

19. The article of claim 18, wherein the mobile subscriber station operating in compliance with the standard IEEE 802.16(e) can operate with FFT sizes of 1024, 512, and 128.

20. The article of claim 15, wherein the operation of setting the MAC version object to a configuration for a fixed subscriber station comprises setting the MAC version object to a configuration for a fixed subscriber station compliant with standard IEEE 802.16(e).

21. The article of claim 20, wherein the fixed subscriber station operating in compliance with the standard IEEE 802.16(e) can operate with FFT sizes of 1024, 512, and 128.

* * * * *